United States Patent

Sohm

(10) Patent No.: US 7,454,452 B2
(45) Date of Patent: Nov. 18, 2008

(54) FAST FOURIER TRANSFORM OPERATION WITH REDUCED CACHE PENALTY

(75) Inventor: Oliver P. Sohm, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 742 days.

(21) Appl. No.: 10/811,356

(22) Filed: Mar. 25, 2004

(65) Prior Publication Data

US 2004/0225700 A1    Nov. 11, 2004

Related U.S. Application Data

(60) Provisional application No. 60/457,266, filed on Mar. 25, 2003.

(51) Int. Cl.
*G06F 15/00*   (2006.01)

(52) U.S. Cl. .................. 708/404; 708/400; 708/403; 708/408; 708/409

(58) Field of Classification Search .......... 708/400–409
See application file for complete search history.

(56) References Cited

U.S. PATENT DOCUMENTS

| | | | | |
|---|---|---|---|---|
| 5,293,330 A | * | 3/1994 | Sayegh ................. | 708/406 |
| 6,041,393 A | * | 3/2000 | Hsu ..................... | 711/157 |
| 6,088,714 A | * | 7/2000 | Wadleigh ............. | 708/404 |
| 6,366,937 B1 | * | 4/2002 | Shridhar et al. ...... | 708/409 |
| 6,421,696 B1 | * | 7/2002 | Horton ................. | 708/404 |
| 6,591,284 B1 | * | 7/2003 | Brockmeyer et al. . | 708/400 |

\* cited by examiner

*Primary Examiner*—Lewis A. Bullock, Jr.
*Assistant Examiner*—Michael Yaary
(74) *Attorney, Agent, or Firm*—Robert D. Marshall, Jr.; W. James Brady; Frederick J. Telecky, Jr.

(57) ABSTRACT

A data processing apparatus having data cache performs an N-point radix-R Fast Fourier Transform. If the data set is smaller than the data cache, the data processing apparatus performs the Fast Fourier Transform in $\log_R N$ stages on all the data set in one pass. If the data set is larger than the data cache but smaller than R times the data cache, the data processing apparatus performs a first stage radix-R butterfly computation on all the input data producing R independent intermediate data sets. The data processing apparatus then successively performs second and all subsequent stage butterfly computations on each independent intermediate data set in turn producing corresponding output data. During the first stage radix-R butterfly computations, each of R continuous sets are separated in memory by memory locations equal to the size of a cache line.

5 Claims, 7 Drawing Sheets

FAST FOURIER TRANSFORM OPERATION WITH REDUCED CACHE PENALTY

CLAIM OF PRIORITY

This application claims priority under 35 U.S.C. 119(e) (1) from U.S. Provisional Application No. 60/457,266 filed Mar. 25, 2003.

TECHNICAL FIELD OF THE INVENTION

The technical field of this invention is digital signal processing and more specifically performing a Fast Fourier Transform with reduced cache penalty.

BACKGROUND OF THE INVENTION

From a DSP application perspective, a large amount of fast on-chip memory would be ideal. However, over the years the performance of processors has improved at a much faster pace than that of memory. As a result, there is now a performance gap between CPU and memory speed. High-speed memory is available but consumes much more size and is more expensive than slower memory.

Figure 1:
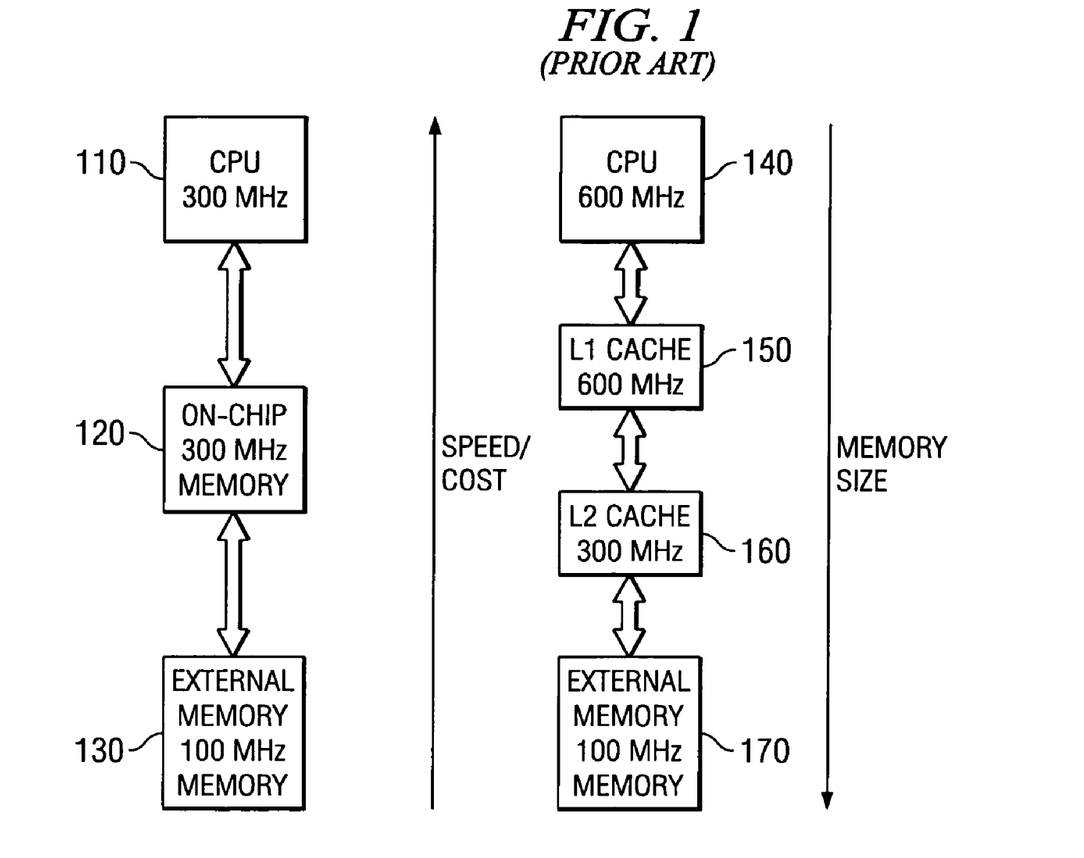
FIG. 1 illustrates a comparison between a flat memory architecture versus hierarchical memory architecture (Prior Art)

FIG. 1 illustrates a comparison of a flat memory architecture versus hierarchical memory architecture. In the flat memory illustrated on the left, both CPU and internal memory 120 are clocked at 300 MHz so no memory stalls occur. However accesses to the slower external memory 130 causes stalls in CPU. If the CPU clock was now increased to 600 MHz, the internal memory 120 could only service CPU accesses every other CPU cycle and CPU would stall for one cycle on every memory access. The penalty would be particularly large for highly optimized inner loops that may access memory on every cycle. In this case, the effective CPU processing speed would approach the slower memory speed. Unfortunately, today's available memory technology is not able to keep up with increasing processor speeds, and a same size internal memory running at the same CPU speed would be far too expensive.

The solution is to use a memory hierarchy, as shown on the right of FIG. 1. A fast but small memory 150 is placed close to CPU 140 that can be accessed without stalls. In this example both CPU 140 and level one (L1) cache 150 operate at 600 MHz. The next lower memory levels are increasingly larger but also slower the further away they are from the CPU. These include level two (L2) cache 160 clocked at 300 MHz and external memory 170 clocked at 100 Hz. Addresses are mapped from a larger memory to a smaller but faster memory higher in the hierarchy. Typically, the higher-level memories are cache memories that are automatically managed by a cache controller. Through this type of architecture, the average memory access time will be closer to the access time of the fastest memory (level one cache 150) rather than to the access time of the slowest memory (external memory 170).

Caches reduce the average memory access time by exploiting the locality of memory accesses. The principle of locality assumes that once a memory location was referenced it is very likely that the same or a neighboring location will be referenced soon again. Referencing memory locations within some period of time is referred to as temporal locality. Referencing neighboring memory locations is referred to as spatial locality. A program typically reuses data from the same or adjacent memory locations within a small period of time. If the data is fetched from a slow memory into a fast cache memory and is accessed as often as possible before it is replaced with other data, the benefits become apparent.

The following example illustrates the concept of spatial and temporal locality. Consider the memory access pattern of a 6-tap FIR filter. The required computations for the first two outputs y[0] and y[1] are:

$$y[0]=h[0] \times x[0]+h[1] \times x[1]+\ldots +h[5] \times x[5]$$

$$y[1]=h[0] \times x[1]+h[1] \times x[2]+\ldots +h[5] \times x[6]$$

Figure 2:
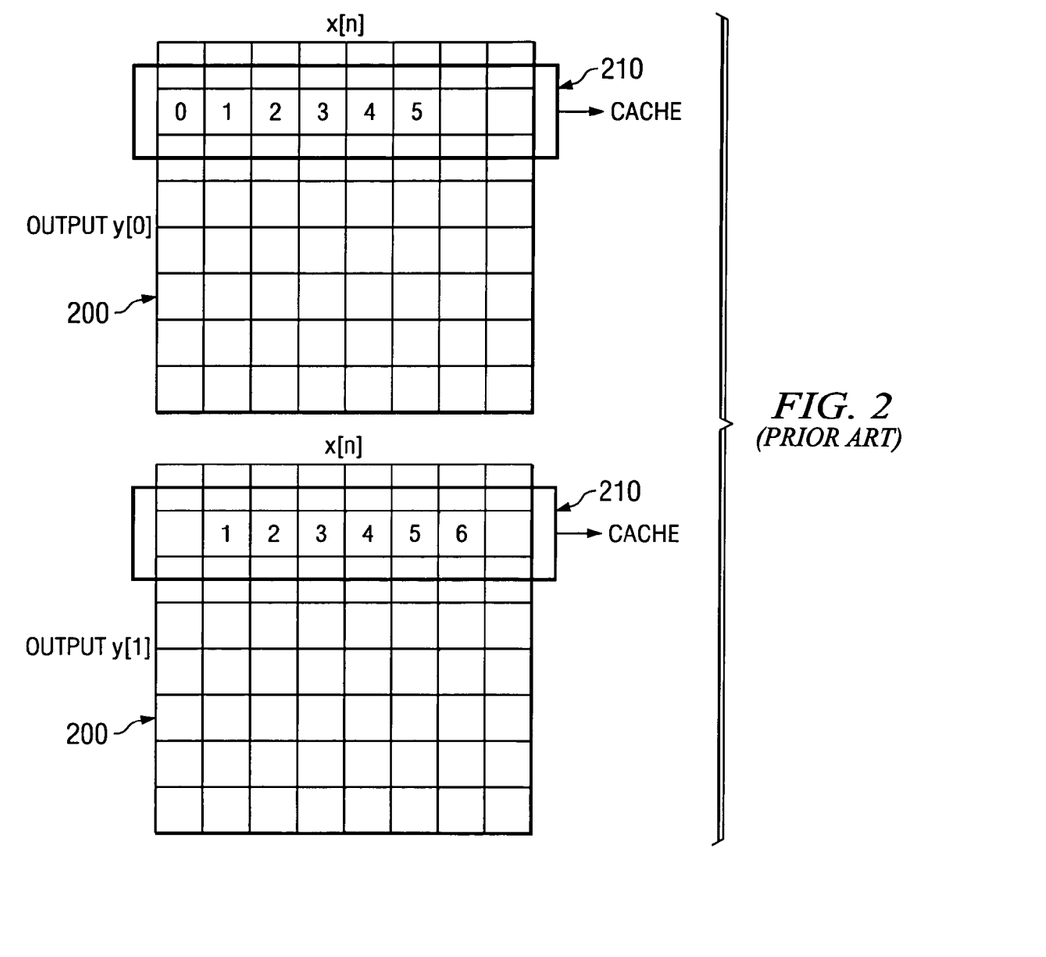
FIG. 2 illustrates the logical overlap of addresses in memory and cache (Prior Art)

Consequently, to compute one output we have to read six data samples from an input data buffer x[i]. The upper half of FIG. 2 shows the memory layout of this buffer and how its elements are accessed. When the first access is made to memory location 0, the cache controller fetches the data for the address accessed and also the data for a certain number of the following addresses from memory 200 into cache 210. FIG. 2 illustrates the logical overlap of addresses of memory 200 and cache 210. This range of addresses is called a cache line. The motivation for this behavior is that accesses are assumed to be spatially local. This is true for the FIR filter, since the next five samples are required as well. Then all accesses will go to the fast cache 210 instead of the slow lower-level memory 200.

Consider now the calculation of the next output y[1]. The access pattern again is illustrated in the lower half of FIG. 2. Five of the samples are reused from the previous computation and only one sample is new. All of them are already held in cache 210 and no CPU stalls occur. This access pattern exhibits high spatial and temporal locality. The same data used in the previous step was used again.

Cache exploits the fact that data accesses are spatially and temporally local. The number of accesses to a slower, lower-level memory are greatly reduced. The majority of accesses can be serviced at CPU speed from the high-level cache memory.

Digital signal processors are often used in real-time systems. In a real-time system the computation must be performed fast enough to keep up the real-time operation outside the digital signal processor. Memory accesses in data processing systems with cache cause real-time programming problems. The time required for memory access varies greatly depending on whether the access can be serviced from the cache or the access must go to a slower main memory. In non-real-time systems the primary speed metric is the average memory access time. Real-time systems must be designed so that the data processing always services the outside operation. This may mean always programming for the worst case data access time. This programming paradigm may miss most of the potential benefit of a cache by acting as though cache were never used. Thus there is a premium on being able to arrange a real-time process to make consistent, optimal use of cache.

SUMMARY OF THE INVENTION

This invention is a method of performing an N-point radix-R Fast Fourier Transform in a data processing apparatus having a data cache. If the data set is smaller than the data cache, the data processing apparatus performs the Fast Fourier Transform in $\log_R N$ stages on all the data set in one pass. If the data set is larger than the data cache but equal to or smaller than R times the data cache, the data processing apparatus performs a first stage radix-R butterfly computation on all the input data producing R independent intermediate data sets in a first pass. The data processing apparatus then successively performs second and all subsequent stage butterfly computations on each independent intermediate data set in turn producing corresponding output data in subsequent passes. This method can use either radix-2 or radix-4 computations.

When performing the first stage radix-R butterfly computations on all the input data, the data processing apparatus divides input data into R continuous sets. This input data is disposed in memory with each R continuous set in continuous memory locations having a space in memory locations equal to the size of a cache line between adjacent sets. This maps the input data to differing cache lines to prevent thrashing.

If the data set is larger than R times the data cache, the data processing apparatus performs I initial stages of radix-R butterfly computations on all the input data producing R independent intermediate data sets. I is the next integer greater than $\log_R$(data set size/cache size). The data processing apparatus then successively performs all subsequent stage butterfly computations on each independent intermediate data set in turn producing corresponding output data in subsequent passes.

BRIEF DESCRIPTION OF THE DRAWINGS

These and other aspects of this invention are illustrated in the drawings, in which.

DETAILED DESCRIPTION OF PREFERRED EMBODIMENTS

Figure 3:
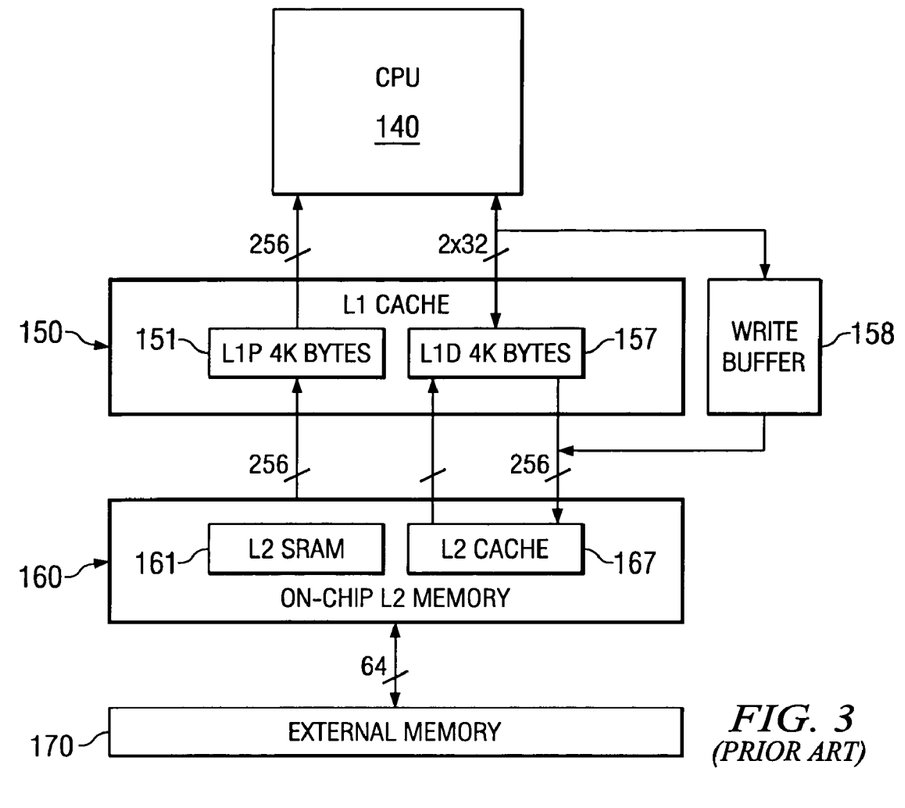
FIG. 3 illustrates the memory architecture of the Texas Instruments TMS320C6000 (Prior Art)

FIG. 3 illustrates the memory architecture of the Texas Instruments TMS320C6000. This memory architecture includes two-level internal cache plus external memory. Level 1 cache 150 is split into L1P instruction cache 151 and L1D data cache 157. All caches and data paths shown in FIG. 3 are automatically managed by the cache controller. Level 1 cache is accessed by CPU 140 without stalls. Level 2 memory 160 is configurable and can be split into L2 SRAM (directly addressable on-chip memory) 161 and L2 combined cache 167 for caching external memory locations. External memory 170 can be several Mbytes large. The access time depends on the memory technology used but is typically around 100 to 133 MHz.

Figure 4:
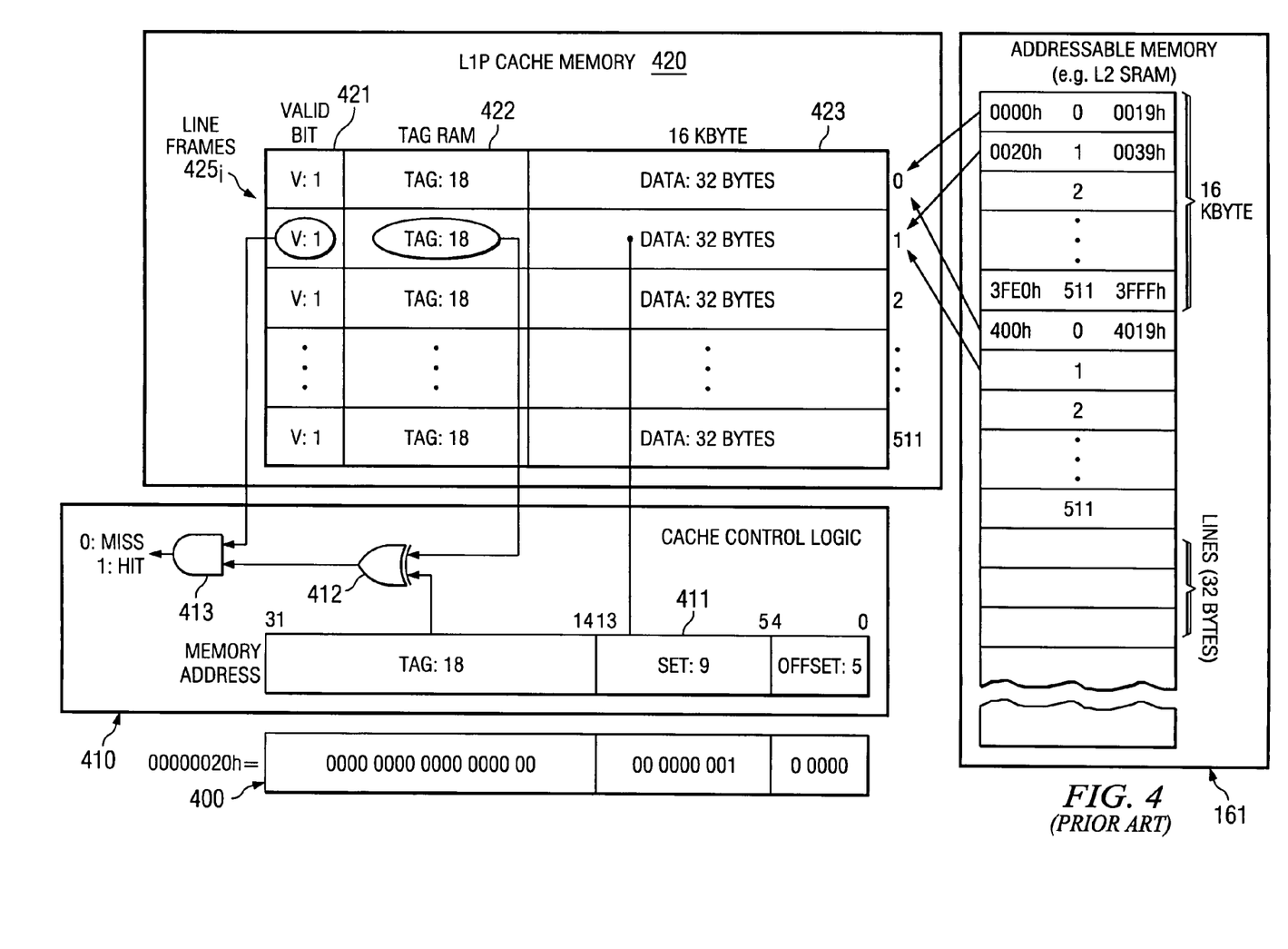
FIG. 4 illustrates the architecture of the direct-mapped level one instruction cache memory and cache control logic of the example memory architecture of FIG. 3 (Prior Art)

Caches are divided into direct-mapped caches and set-associative caches. The L1P cache 151 is direct-mapped and the L1D cache 157 is set-associative. An explanation of direct-mapped cache will employ L1P cache 151 as an example. Whenever CPU 140 accesses instructions in memory, the instructions are brought into L1P cache 151. FIG. 4 illustrates the architecture of L1P cache 151 and the corresponding cache control logic. FIG. 4 illustrates: requested address 400; cache controller 410 including memory address register 411, tag comparator 412 and AND gate 413; and memory array 420 including valid bits 421, tag RAM 422 and data sets 423 disposed in 512 line frames 425. FIG. 4 also illustrates directly addressable memory (L2 SRAM 161). This could be another directly addressable memory such as external memory 170. The L1P cache 151 in this example is 16 Kbytes large and consists of 512 32-byte line frames 425. Each line frame 425 maps to a set of fixed addresses in memory. FIG. 4 illustrates that addresses 0000h to 0019h are always cached in line frame $425_0$ and addresses 3FE0h to 3FFFh are always cached in line frame $425_1$. This fills the capacity of the cache, so addresses 4000h to 4019h map to line frame $425_0$, and so forth. Note that one line contains exactly one instruction fetch packet of 8 32-bit instructions.

Consider a CPU instruction fetch access to address location 0020h. Assume the cache is completely empty, thus no line frame contains cached data. The valid state of a line frame 425 is indicated by the valid (V) bit 421. A valid bit of 0 means that the corresponding cache line frame 425 is invalid and does not contain cached data. When CPU 140 makes a request to read address 0020h, the cache controller 410 splits up the address into three portions illustrated in FIG. 5.

Figure 5:
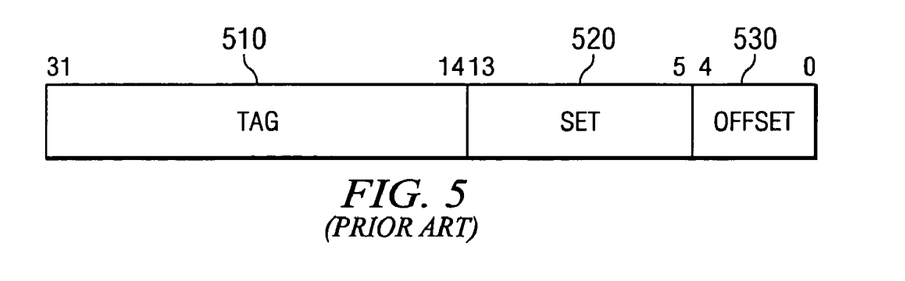
FIG. 5 illustrates the parts of the requested address relevant to cache control (Prior Art)

The set portion 520 (bits 13-5) indicates to which set the address maps. In case of direct-mapped caches as in this example, a set is equivalent to a line frame 425. For the address 0020h, the set portion is 1. Cache controller 410 includes tag comparator 412 which compares the tag portion 510 (bits 14 to 31) of address 400 with the tag from tag RAM 422 of the indicated set. Cache controller 410 ANDs the state of the corresponding valid bit 421 with the tag compare result in AND gate 413. A 0 result is a miss, the cache does not contain the instruction address sought. This could occur if the address tag portions do not match or if the valid bit 421 is 0. A 1 result is a hit, the cache stores the instruction address sought. Since we assumed that all valid bits 421 are 0, cache controller 410 registers a miss, that is the requested address is not contained in cache.

A miss also means that the line frame 425 of the set to which address 400 maps will be allocated for the line containing the requested address. Cache controller 410 fetches the line (0020h-0039h) from memory 160 and stores the data in line frame 1 (425a). The tag portion 520 of the address is stored in the corresponding tag entry of tag RAM entry 422 and the corresponding valid bit 421 is set to 1 to indicate that the set 423 now contains valid data. The fetched data is also forwarded to CPU 140 completing the access. The tag portion of the address store in tag RAM 422 is used when address 0020h is accessed again.

Cache controller 410 splits up the requested address into the three portions shown in FIG. 5. These are the tag portion 510 (bits 14 to 31), the set portion 520 (bits 5 to 13) and the offset portion 530 (bits 0 to 4). The set portion 520 (bits 5 to 13) of address 400 determines which line frame 425 stores the data. As previously described, each memory address maps to one line frame 425. Cache controller 410 compares the stored tag portion from tag RAM 422 of that set with the tag portion 510 of the address requested. This comparison is necessary since multiple lines in memory are mapped to the same set. If the set stored address 4020*h* which also maps to the same set, the tag portions would be different. In that case tag comparator 412 would not detect a match and the access would have been a miss. In this example, the 9 set bits 520 select one of the 512 line frames 425. The offset portion (bits 0 to 4) of address 411 designates where within the corresponding line frame 425 the requested data resides. In this example, each line frame 425 stores 32 bytes and the memory is byte addressable. Thus the 5 bit offset 530 indicates which of the 32 bytes in set portion 423 is the requested instruction address. Upon forwarding the corresponding instruction to CPU 140, the access is completed.

There are different types of cache misses. The ultimate purpose of a cache is to reduce the average memory access time. For each miss, there is a penalty for fetching a line of data from memory into cache. Therefore, the more often a cache line is reused the lower the impact of the initial penalty and the shorter the average memory access time. The key is to reuse this line as much as possible before it is replaced with another line.

Replacing a line involves eviction of a line currently stored in the cache and using the same line frame 425 to store another line. If the evicted line is accessed later, the access misses and that original line has to be fetched again from slower memory. Therefore, it is important to avoid eviction of a line as long as it is still used.

A memory location may access a memory address that maps to the same set as a memory location that was cached earlier. This type of miss is referred to as a conflict miss. Such a miss occurs because the line was evicted due to a conflict before it was reused. It is further distinguished by whether the conflict occurred because the capacity of the cache was exhausted. If the capacity was exhausted and all line frames in the cache were allocated when the miss occurred, then the miss is referred to as a capacity miss. Capacity misses occur if a data set that exceeds the cache capacity is reused. When the capacity is exhausted, new lines accessed start replacing lines from the array. A conflict miss occurs when the data accessed would fit into the cache but lines must be evicted because they map into a line frame already caching another address.

Identifying the cause of a miss may help to choose the appropriate measure for avoiding the miss. It is possible to change the memory layout so that the data accessed is located at addresses in memory that do not conflict by mapping to the same set in the cache. A hardware design alternative is to create sets that can hold two or more lines. Thus, two lines from memory that map to the same set can both be kept in cache without evicting one another. This is called a set-associative cache.

One solution to capacity misses is to attempt to reduce the amount of data that is operated on at a time. Alternatively, the capacity of the cache can be increased.

A third category of cache misses are compulsory misses or first reference misses. These occur when the data is brought into the cache for the first time. Unlike capacity and conflict misses, first reference misses cannot be avoided. Thus they are called compulsory misses.

Set-associative caches have multiple cache ways to reduce the probability of conflict misses. A 2-way cache set associative cache differs from a direct-mapped cache in that each set consists of two line frames, one line frame in way 0 and another line frame in way 1. A line in memory still maps to one set, but now can be stored in either of the two line frames. These are called ways. In this sense, a direct-mapped cache can also be viewed as a 1-way set associative cache.

Figure 6:
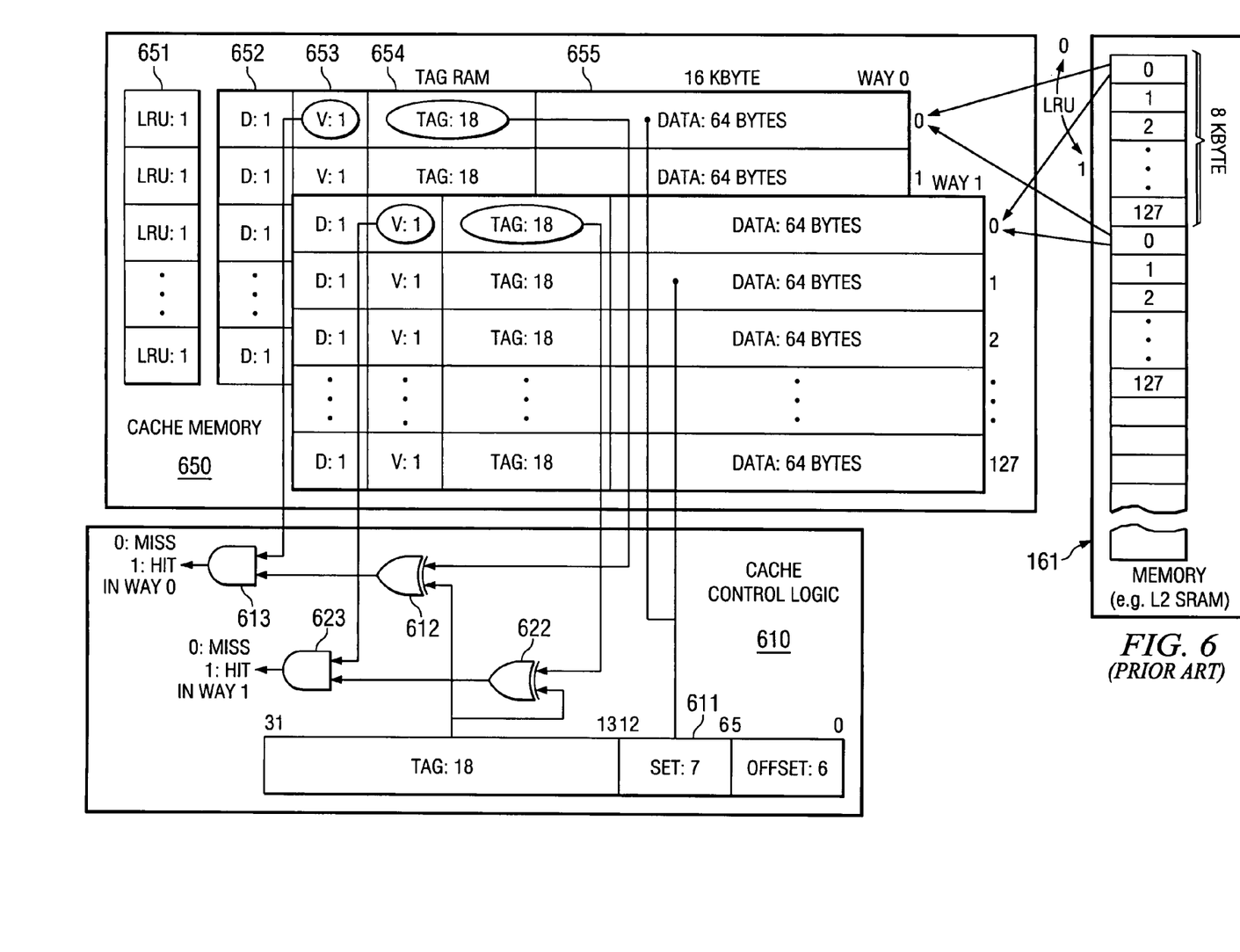
FIG. 6 illustrates the architecture of the two-way set associative level one data cache memory and cache control logic of the example memory architecture of FIG. 3 (Prior Art)

FIG. 6 illustrates the operation of a 2-way set-associative cache architecture in conjunction with L1D cache 157. FIG. 6 illustrates: cache controller 610 including memory address register 611, tag comparators 612 and 622, and AND gates 613 and 623; and memory array 650 including least recently used bits 651, dirty bits 652, valid bits 653, tag RAM 654 and data sets 655 disposed in 256 line frames 656 disposed in two ways; and directly addressable memory (L2 SRAM 161). Note that one instance of least recently used bit 651 is provided for each set but that two instances of dirty bits 652, valid bits 653, tag RAM 654 and data sets 655 are provided for each set, one for each way. The L1D cache 157 in this example is 16 Kbytes large and consists of 256 64-byte line frames 656 including 128 line frames 656 for each way. Note that now there are 7 set bits selecting one of 128 sets and 6 offset bits selecting on byte of 64 bytes.

Hits and misses are determined similarly as in a direct-mapped cache. However, each access requires two tag comparisons, one for each way. The set bits select one set of each way. Tag comparator 612 compares the tag portion of the address stored in requested address register 611 with the tag bits of the corresponding set in way 0. Tag comparator 622 compares the tag portion of the address stored in requested address register 611 with the tag bits of the corresponding set in way 1. These comparisons are conditioned by the corresponding valid bits 653 in respective AND gates 613 and 632. If there is a read hit in way 0, the data of the line frame in way 0 is accessed. If there is a hit in way 1, the data of the line frame in way 1 is accessed.

If both ways miss, the data first needs to be fetched from memory. The least-recently-used (LRU) bit 651 determines which cache way is allocated for the new data. An LRU bit 651 exists for each set and operates as a switch. If the LRU bit 651 is 0, the line frame in way 0 is allocated. If the LRU bit 651 is 1, the line frame in way 1 is allocated. The state of the LRU bit 651 changes whenever an access is made to the line frame. When a way is accessed, LRU bit 651 switches to the opposite way. This protects the most-recently-used line frame from being evicted. On a miss the least-recently-used (LRU) line frame in a set is allocated to the new line evicting the current line. The reason behind this line replacement scheme is the principle of locality. If a memory location was accessed, then the same or a neighboring location will be accessed soon again. Note that the LRU bit 651 is only consulted on a miss, but its status is updated every time a line frame is accessed regardless whether it was a hit or a miss, a read or a write.

In this example, L1D cache 157 is a read-allocate cache. A line is allocated on a read miss only. On a write miss, the data is written to the lower level memory through a write buffer 158, bypassing L1D cache 157.

On a write hit, the data is written to the cache, but is not immediately passed on to the lower level memory. This type of cache is referred to as write-back cache. Data modified by a CPU write access is written back to memory at a later time. To write back modified data, the cache notes which line are written to by CPU 140. Every cache line has an associated dirty bit (D) 653 for this purpose. Initially, the dirty bit 653 is 0. As soon as CPU 140 writes to a cached line, the corresponding dirty bit 653 is set to 1. When the dirty line (dirty bit 653 is 1) needs to be evicted due to a conflicting read miss, it will be written back to memory. If the line was not modified (dirty bit 653 is 0), its contents are discarded. For instance, assume the line in set 0, way 0 was written to by CPU 140, and LRU bit 651 indicates that way 0 is to be replaced on the next miss. If CPU 140 now makes a read access to a memory location that maps to set 0, the current dirty line is first written back to memory, and then the new data is stored in the line frame. A write-back may also be initiated by a user program through a writeback command sent to the cache controller. Scenarios where this is required include boot loading and self-modifying code.

The following discussion assumed that there is one level of cache memory between CPU 140 and addressable main memory 170. If there is a larger difference in memory size and access time between the cache and main memory, a second level of cache may be introduced to further reduce the number of accesses to main memory. Level 2 (L2) cache 167 generally operates in the same manner as level 1 cache. Level 2 cache 167 typically has a larger capacity. Level 1 and level 2 caches interact as follows. An address misses in L1 and is passed to L2 cache 167 for handling. Level 2 cache 167 employs the same valid bit and tag comparisons to determine if the requested address is present. L1 hits are directly serviced from the L1 caches and do not require involvement of L2 cache 167.

The Texas Instruments TMS320C6000 L2 memory 160 can be split into an addressable internal memory (L2 SRAM 161) and a cache (L2 cache 167) portion. Unlike the L1 caches in this example that are read-allocate only, L2 cache 167 is a read and write allocate cache. L2 cache 167 is used to cache external memory addresses only. LIP cache 151 and L1D cache 157 are used to cache both L2 SRAM 161 and external memory addresses.

Consider a CPU read request to a cacheable external memory address that misses in L1. For this example it does not matter whether it misses in LIP cache 151 or L1D cache 157. If the address also misses L2 cache 167, the corresponding line will be brought into L2 cache 167. The LRU bits determine the way in which the line frame is allocated. If the evicted line frame contains dirty data, this will be first written back to external memory 170 before the new line is fetched. If dirty data of this line is also contained in L1D cache 157, this will be first written back to L2 cache 167 before the L2 line is sent to external memory 170. This is required to maintain cache coherence. The portion of the line forming an L1 line and containing the requested address is then forwarded to the L1 cache. The L1 cache stores the line and forwards the requested data to CPU 140. If the new line replaces a dirty line in L1D cache, this evicted data is first written back to L2 cache 167. If the address was an L2 hit, the corresponding line is directly forwarded from L2 cache 167 to L1.

If a CPU write request to an external memory address misses L1D cache 157, it is passed on to L2 cache 167 through write buffer 158. If L2 cache 167 detects a miss for this address, the corresponding L2 cache line is fetched from external memory 170, modified with the CPU write, and stored in the allocated line frame. The LRU bits determine the way in which the line frame is allocated. If the evicted line frame contains dirty data, this data is first written back to external memory 170 before the new line is fetched. Note that the line was not stored in L1D cache 157, since L1D cache 157 is a read-allocate cache only. If the address was an L2 hit, the corresponding L2 cache line frame is directly updated with the CPU write data.

Note that some external memory addresses may be configured as non-cacheable. On read accesses, the requested data is simply forwarded from external memory 170 to the CPU without being stored in any of the caches. On write accesses, the data is directly updated in external memory 170 without being stored in cache.

In general, the FFT algorithm operates as shown in Equation 1.

$$X[k] = \sum_{i=0}^{N-1} W^{k-1} x[i] \qquad (1)$$

where: W equals $$e^{\frac{-j\pi}{2N}};$$

x[i] is in the time domain; X[k] is in the frequency domain; and N is the number of points in the transform. Fast Fourier transform of Equation 1 is recursively decomposed into a series of passes. Each transforms the data using a butterfly as its basic unit of computation. The following focuses on the Decimation in Frequency (DIF) flow graph. The DIF version has the input data in linear form, but the output data in the frequency domain is in radix reversed format. The butterfly can be written in radix-2 and radix-4 forms. In the radix-4 form, the DFT can be decomposed into 4 subintervals 4k, 4k+1, 4k+2 & 4k+3 to give the standard butterfly equations. The transform becomes a linear combination of 4 sub-transforms:

$$X[4k] = \sum_{i=0}^{N/4-1} \left( x[i] + x\left[i+\frac{N}{4}\right] + x\left[i+\frac{N}{2}\right] + x\left[i+\frac{3N}{4}\right] \right) W_{N/4}^{k-1} \qquad (2)$$

$$X[4k+1] = \sum_{i=0}^{N/4-1} \left( x[i] - jx\left[i+\frac{N}{4}\right] - x\left[i+\frac{N}{2}\right] + jx\left[i+\frac{3N}{4}\right] \right) W^i W_{N/4}^{k-1}$$

$$x[4k+2] = \sum_{i=0}^{N/4-1} \left( x[i] - x\left[i+\frac{N}{4}\right] + x\left[i+\frac{N}{2}\right] - x\left[i+\frac{3N}{4}\right] \right) W^{2i} W_{N/4}^{k-1}$$

$$X[4k+3] = \sum_{i=0}^{N/4-1} \left( x[i] + jx\left[i+\frac{N}{4}\right] - x\left[i+\frac{N}{2}\right] - jx\left[i+\frac{3N}{4}\right] \right) W^{3i} W_{N/4}^{k-1}$$

In a similar way the radix-2 case the function is decomposed into 2 sub-intervals 2k & 2k+1.

$$X[2k] = \sum_{i=0}^{N/2-1} \left( x[i] + x\left[i+\frac{N}{2}\right] \right) W_{N/2}^{k-i} \qquad (3)$$

$$X[2k+1] = \sum_{i=0}^{N/2-1} \left( x[i] - x\left[i+\frac{N}{2}\right] \right) W^i W_{N/2}^{k-1}$$

These equations are repeatedly applied to the input data for all $0 \leq i \leq N$. For the radix-4 case, the maximum index decreases from N/4 to 4 throughout the DIF trellis. In the initial butterflies the data is spaced N/4 apart. In the second iteration, the butterflies are spaced N/16 apart and the twiddle factors are further decimated by a factor of 4. This continues until the end of the transform where the coefficients are W=1+0j. The final stage is merely a sequence of 4 point transforms. The development of the radix-2 transform is similar.

This invention involves modification to a Fast Fourier Transform (FFT) operation for optimal data cache usage. The examples of this application use the fft16x16r routine modified for higher cache efficiency. This routine employs 16-bit data for both real and imaginary parts of the input data and 16-bit real and imaginary parts of the twiddle factors. The routine can be called in a single-pass or a multi-pass fashion. As single pass, the routine behaves like other FFT routine in terms of cache efficiency. If the total data size accessed by the routine fits in L1D cache 157, the single pass use of fft16x16r is most efficient. The total data size accessed for an N-point FFT is N×2 complex parts×2 bytes for the input data plus the same amount for the twiddle factors. This is a total of 8×N bytes. Therefore, if 8×N bytes is less than or equal to the cache capacity, then no special considerations need to be given to cache and the FFT can be called in the single-pass mode. For example, if the L1D cache 157 capacity is 4 Kbytes, then an N of 512 has data size that fits within the cache. Note that if N≦4 Kbytes/8=512, the single-pass FFT gives the best performance. For an L1D capacity of 16 Kbytes, the single-pass FFT is the best choice if N≦2048. The multi-pass version should be used whenever N>L1D capacity/8.

The API for the fft16x16r routine is listed in Listing 1.

```
void fft16x16r
(
    int             N,
    short           *x,
    short           *w,
    unsigned char   *brev,
    short           *y,
    int             n_min,
    int             offset,
    int             nmax
);
```

Listing 1

The function arguments are: N is the length of the FFT in complex samples, a power of 2≦16,384; x[2×N] is the complex input data; w[2×N] is the complex twiddle factors; brev [64] is the bit reverse table used in a known fashion for data access; y[2×N] is the complex data output; n_min is the smallest FFT butterfly used in computation for decomposing FFT into sub-FFTs; offset is the index to sub-FFT from start of main FFT in complex samples; and nmax is the size of main FFT in complex samples.

The FFT routine uses a decimation-in-frequency algorithm that is able to perform radix-2 and radix-4 FFTs. In the first part of the algorithm, $\log_4(N-1)$ radix-4 stages are performed. The second part then performs either another radix-4 stage or a radix-2 stage in case N is a power of 2. Since for the final stage the twiddle factors are ±1 and ±j, no multiplications are required. The second part performs a digit or bit-reversal. The computation of the first part is in-place, while the second part is out-of-place. In-place computation has the advantage that only compulsory read misses occur when the input and twiddle factors are read for the first time. The output of each stage is written back to the input array which is kept in L1D cache 157. This eliminates all write buffer related stalls and read misses for the following stage provided all data fits into L1D cache 157. Only the output of the last stage is passed through the write buffer 158 to L2 memory 160. Due to the high data output rate this generally results in write buffer full stalls.

Figure 7:
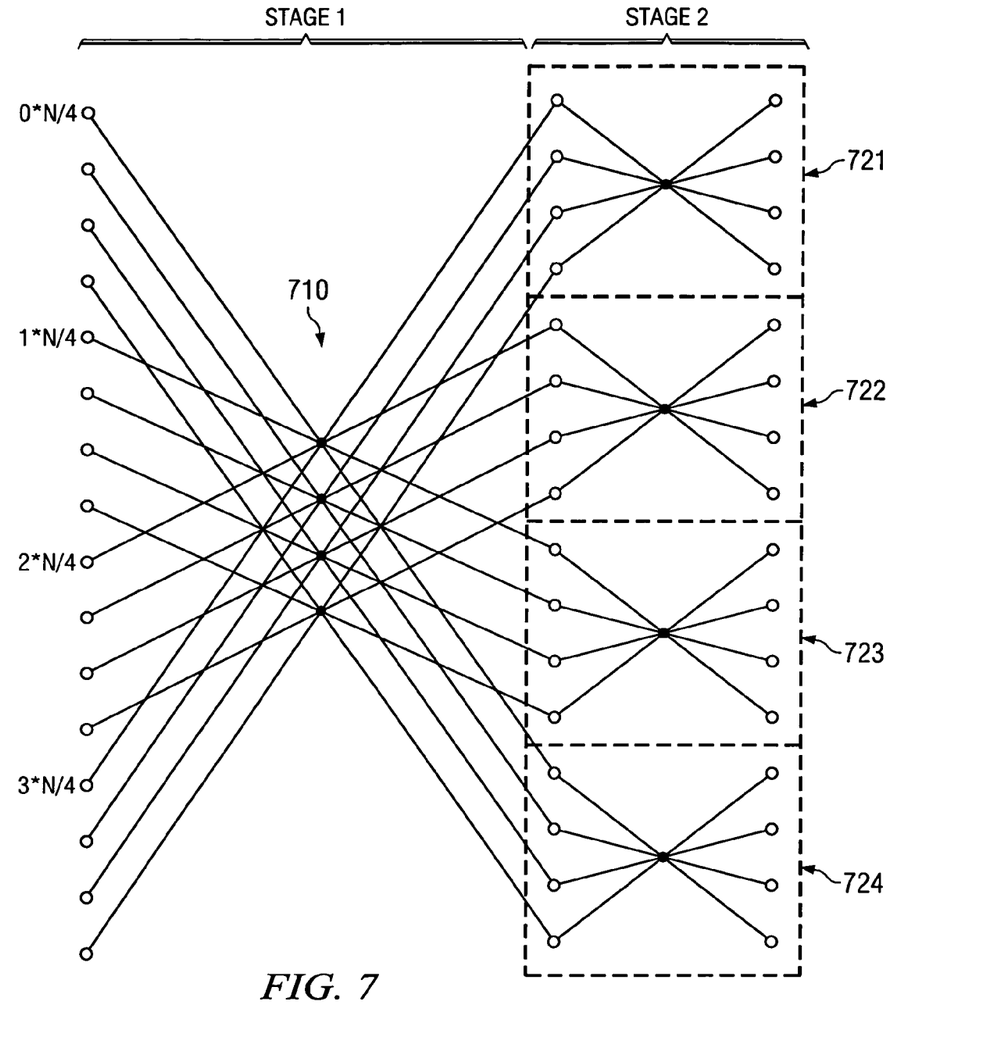
FIG. 7 illustrates two stage Fast Fourier Transform (FFT) computation of this invention.

All fftN×N type routines (N bit complex data and N bit complex twiddle factors) of this invention use a redundant set of twiddle factors where each radix-4 stage has it own set of twiddle factors. FIG. 7 illustrates the computation. The first stage comprises ¾×N twiddle factors, the second stage 3/16× N, the third stage 3/64×N, etc. There are $\log_4 N$ stages and twiddle factor sets. All twiddle factors required for the entire FFT are contained in the first set. For the following stages, the twiddle factors required for a butterfly are no longer located contiguously in memory that would prevent the use of a load double word command to load two complex twiddle factors. Another benefit of having individual twiddle factor sets per stage is that now the FFT can be decomposed into multiple smaller FFTs that fit into cache.

If all the FFT input sample data and twiddle factors fit into L1D cache 157, the routine only suffers compulsory misses. All FFT data fits in a 4K byte L1D cache 157 for N×512. A 512-point FFT causes 128 misses (=8 bytes×512 points/32 bytes per cache line) and results in 512 stall cycles (=128 misses×4 stalls per miss).

To assess potential write buffer full stalls in the last stage of the FFT, note that the kernel loop consists of 8 cycles and 4 store word instructions (STW). Write buffer 158 drains at a rate of 2 cycles per entry. If writing operates at the average rate, there should be no write buffer full stalls. However if there had been bursts of writes, write buffer full can still occur even though the average drain rate was not exceeded. These stores should be scheduled so that entries are allowed to drain before write buffer 158 becomes full. Write buffer 158 can contain no more than two entries at a time.

Though not the main focus of this invention, L1P stalls can be estimated through the code size, which is 1344 bytes. Thus, the number of L1P misses are 21 (=1344 bytes/64 bytes per cache line) and the number of stalls are 105 (=21 misses×5 cycles per miss).

Listing 2 is the 512 point FFT routine called in a single-pass mode.

```
#define N 512
#define RADIX 2
short x[2*N];              /* input samples */
short w[2*N];              /* twiddle factors created by
                              twiddle factor generator */
short y[2*N];              /* output data */
unsigned char brev[64];    /* bit reverse index table */
fft16x16r(N, x, w, brev, y, RADIX, 0, N);
```

Listing 2

The twiddle factors can be generated with a twiddle factor generator program. The array brev has to be initialized. The argument n_min is set equal to the radix of the FFT. This is 4 if N is a power of 4, and 2 if N is a power of 2. The arguments offset and nmax are only required for multi-pass mode. For the single-pass mode offset and nmax should always be 0 and N, respectively.

Benchmark results of this algorithm are shown in Table 1. Table assumes that L1P cache 151 and L1D cache 157 are both 4K bytes.

TABLE 1

| N = 512, L1D = 4K bytes | Cycles |
|---|---|
| Execute Cycles | 6,308 |
| L1D Stalls Cycles | 600 |
| L1D Read Misses | 139 |
| L1D Read Miss Stalls | 556 |
| L1D Write Buffer Full | 15 |
| L1P Stalls | 123 |
| L1P Misses | 22 |
| Total | 7,016 |

There are 139 L1D read misses instead of the expected 128. The additional misses are due to accesses to the bit-reverse index table (up to 3 cache lines) and stack accesses (about 5 cache lines) within the routine. The write buffer full stalls are caused by a series of 20 stores for saving register contents on the stack.

If the FFT data exceeds the capacity of L1D cache 157, not all data can be held in L1D cache 157. For each stage, input data and twiddle factors are read and the butterflies computed. The input data is overwritten with the results that are then read again by the following stage. When the capacity is exhausted, new read misses will evict already computed results and the twiddle factors and the following stage will suffer capacity misses. These capacity misses can be partially avoided if the computation of the FFT is split up into smaller FFTs that fit into cache.

Consider the radix-4 16-point FFT shown in FIG. 7. After computing the first stage, the data of all four butterflies of stage 2 are independent and can be computed individually. Generally after each radix-4 FFT stage, an N-point input data set splits into 4 separate N/4-point data sets whose butterflies are completely independent from one another. This tree structure of the FFT makes decomposition possible. Assume that the data for an N-point FFT exceeds L1D cache 157, but that data for an N/4-point FFT fits. Instead of computing the entire FFT stage after stage as in the prior art, computation stops after the first stage 710. This produces 4 N/4-point data sets 721, 722, 723 and 724. Sequential computation of 4 individual N/4-point FFTs 721, 722, 723 and 724 on the output data of the first stage completes the N-point FFT. Since each of the N/4-point FFT fits into cache, misses only occur for the first stage of each of the N/4-point FFT. If the FFT had been computed conventionally, each stage would have suffered capacity misses.

Assume computation of a 2048-point FFT. The data size is 8×2048=16,384 bytes. This is four times the size of L1D cache 157 in this example. After the first stage, there are four data sets with 512 points each. The data for a 512-point FFT fits into L1D cache 157 of this example. Thus the FFT is decomposed into the first stage of a 2048-point FFT plus four 512-point FFTs that compute the remaining stages. The required calling sequence of the FFT routine is shown in Listing 3.

The argument nmin is N/4 that specifies the routine to exit after the stage whose butterfly input samples are a stride of N/4 complex samples apart after the first stage. For the sub-FFTs, nmin becomes RADIX that means the FFT is computed to the end. The first argument now changes to N/4 to indicate that we compute N/4-point FFTs. The argument offset indicates the start of the sub-FFT in the input data set. The pointers to the input array also have to be offset. Since each FFT stage has its own set of twiddle factors, the twiddle factors for the first set (3×N/4 complex twiddle factors) are skipped and set to point to the ones for the second stage. All sub-FFTs start at the second stage. The pointer into the twiddle factor array is the same for all sub-FFT calls.

For the first call of the subroutine fft16×16r, there will be compulsory and conflict misses. For all following calls, there are only compulsory misses due to the first time access of data and twiddle factors. Since the sub-FFTs process a 512-point input data set, we can expect the same number of cache stalls as listed in Table 1. The cycle counts measured are shown in Table 2.

TABLE 2

| N = 2048 | First Call | Second Call | Third to Fifth Call | Total |
| --- | --- | --- | --- | --- |
| Execute Cycles | 5138 | 6308 | 6308 | 30,370 |
| L1D Stalls Cycles | 10,302 | 633 | 565 | 12,630 |
| L1D Read Misses | 10,287 | 612 | 550 | 12,549 |
| L1D Read Miss Stalls | 2572 | 153 | 137 | 3136 |
| L1D Write Buffer Full | 15 | 15 | 15 | 75 |
| L1P Stalls | 103 | 10 | 10 | 143 |
| L1P Misses | 21 | 2 | 2 | 29 |
| Total | 15,543 | 6946 | 6883 | 43,138 |

The total estimated execute cycle count for a single-pass FFT is 29,860. This is very close to an actual measured value of 30,370 cycles. It is slightly higher due to the call overhead for calling the function five times. As expected most of the

```
#define N 2048
#define RADIX 2
short x[2*N];              /* input samples */
short w[2*N];              /* twiddle factors created by
                              twiddle factor generator */
short brev[64];            /* bit reverse index table */
short y[2*N];              /* output data */
                           /* Stage 1 of N-point FFT: */
fft16x16r(N, &x[ 0], &w[ 0], brev, &y[0], N/4, 0, N);
                           /* Four N/4-point FFTs: */
fft16x16r(N/4, &x[      0], &w[2*3*N/4], brev, &y[0], RADIX, 0, N);
fft16x16r(N/4, &x[2*1*N/4], &w[2*3*N/4], brev, &y[0], RADIX, 1*N/4, N);
fft16x16r(N/4, &x[2*2*N/4], &w[2*3*N/4], brev, &y[0], RADIX, 2*N/4, N);
fft16x16r(N/4, &x[2*3*N/4], &w[2*3*N/4], brev, &y[0], RADIX, 3*N/4, N);
```

Listing 3

L1D stalls are caused by the first call (first FFT radix-4 stage). Once the FFT fits into L1D, we mostly see the compulsory misses for the data. For a 4096-point FFT, two stages have to be computed to obtain 16 256-point FFTs that fit into cache. The code would then change as shown in Listing 4.

```
#define N 4096
#define RADIX 4
short x[2*N];              /* input samples */
short w[2*N];              /* twiddle factors created by
```

```
                                      twiddle factor generator */
short brev[64];                       /* bit reverse index table */
short y[2*N];                         /* output data */
                                      /* Stage 1 and 2 of N-point FFT: */
fft16x16r(N, &x[0], &w[0], brev, &y[0], N/16, 0, N);
                                      /* 16 N/16-point FFTs: */
for (i=0; i<16;i++)
fft16x16r(N/16, &x[2*i*N/16], &w[2*(3*N/4+3*N/16)], brev, &y[0], RADIX, i*N/16, N);
```

Listing 4

Figure 8:
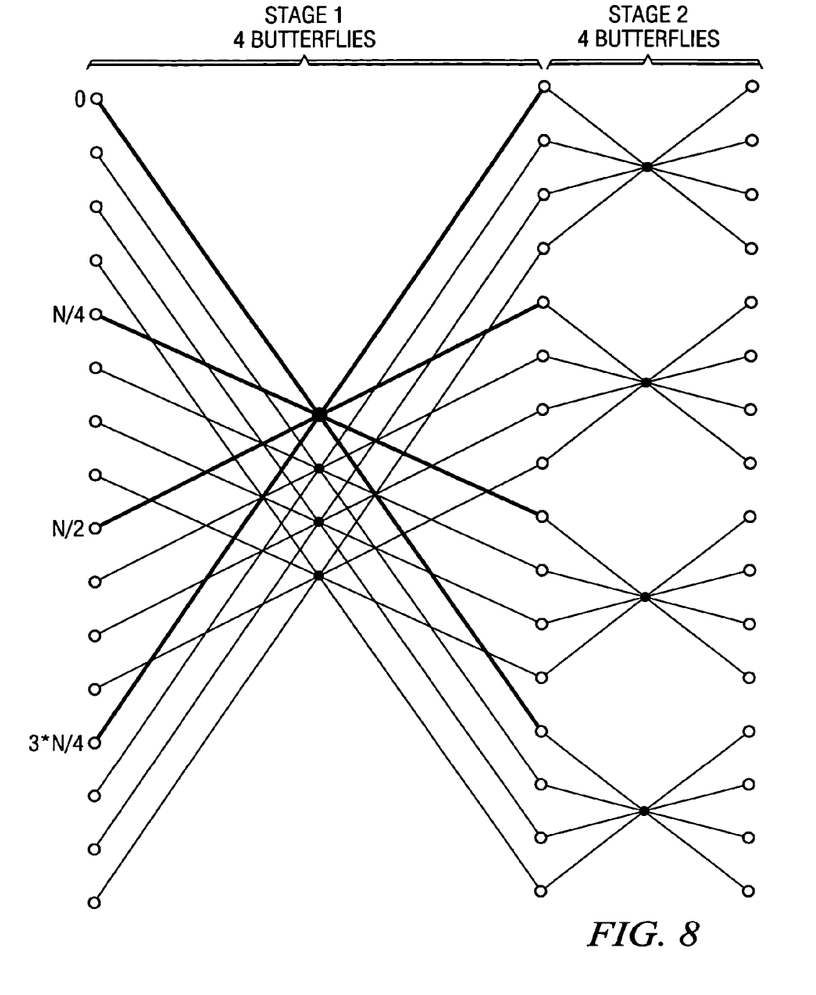
FIG. 8 illustrates in further detail data flow in a two stage Fast Fourier Transform (FFT) computation of this invention.

The previous examples showed that the majority of cache misses occur in the initial FFT stages that exceed the cache capacity. The majority of these misses are conflict misses caused by thrashing. FIG. 8 illustrates how these conflict misses occur in the computation of the first two butterflies of the stage 1 in the 16-point radix-4 FFT.

The first butterfly accesses the input data elements x[0], x[N/4], x[N/2] and x[3*N/4] (highlighted in FIG. 8). The second butterfly accesses the elements x[2], x[N/4+2], x[N/2+2] and x[3*N/4+2]. Assume N/4 complex input samples consume one cache way. This is half of the L1D capacity in this example of a two-way set associative cache. In this case, all four addresses of the elements of the two butterflies map to the same set. Initially, elements x[0] and x[N/4] are allocated in L1D in different ways. However, the access of x[N/2] and x[3*N/4] evicts these two elements. Since x[0] and x[2] share the same line, the access to x[2] misses again, as do all remaining accesses for the second butterfly. Consequently, every access to an input sample misses due to conflicts. Thus there is no line reuse. Instead of one miss per line, we see one miss per data access. The accesses to twiddle factors may interfere with input data accesses, but this interference is not significant. The twiddle factors are ordered such that they accessed linearly for a butterfly, thus avoiding conflicts.

Such repeated conflict cache misses are called thrashing. These conflict cache misses occur when the FFT data is larger than the cache, the number of cache ways is less than the radix number and data size divided by the radix number is an integral multiple or divisor of the cache way size. There are several known hardware methods to deal with this cache thrashing. The cache size could be increased. The number of cache ways could be increased. The cache way size could be changed to avoid the integral multiple/divisor relationship. Each of these solutions increases the cost of the data processor. Changing the cache way size would be effective only for the particular combination of number of points and radix number and may not work for other combinations which the data processor would be called to perform. These hardware solutions cannot be applied to existing data processors. Thus a software solution which could be applied to existing hardware would be very useful.

Figure 9:
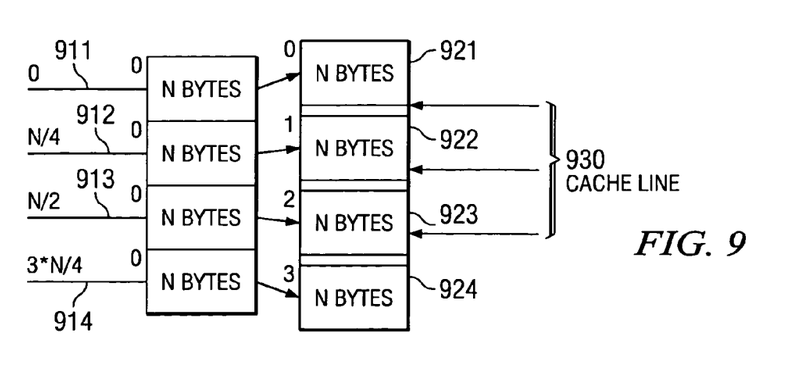
FIG. 9 illustrates the insertion of a gap of one cache line between data sets in accordance with this invention.

These conflict misses can be avoided in this radix-4 example if each of the four input elements of a butterfly maps to a different set. To achieve this, the input data is split into four sets consisting of N/4 complex samples each and a gap of one cache line is inserted after each set. This is illustrated in FIG. 9. The original data is divided into blocks of N bytes of data 911, 912, 913 and 914. These are disposed in continuous memory locations. In the new data layout blocks of N bytes of data 921, 922, 923 and 924 are separated by a cache line size gap 930. This new memory layout requires modification of the FFT routine to add an offset to the input data array indices as shown in Table 3.

| Normal Access Pattern | Modified Access Pattern |
|---|---|
| x[i] | x[i] |
| x[N/4 + i] | x[N/4 + i + L1D_LINESIZE/2] |
| x[N/2 + i] | x[N/2 + i + L1D_LINESIZE] |
| x[3 × N/2 + i] | x[3 × N/2 + i 3 × L1D_LINESIZE] |

Table 3

Note x[i] is defined as short and the increment i is 2 to access complex samples. Listing 5 shows the modified assembly routine.

```
#define CACHE_L1D_LINESIZE 64
#define N 8192
#define RADIX 2
#define GAP 1
#define NO_GAP 0
short x[2*N];                      /* input samples */
short xc [2*N + 3*CACHE_L1D_LINESIZE/2];
                                   /* input samples split up */
short w [2*N];                     /* twiddle factors created by
                                      twiddle factor generator */
short y [2*N];                     /* output data */
                                   /* Copy and split the input data */
for(i=0; i<4; i++)
{
touch (&x[2*i*N/4], 2*N/4*sizeof(short));
DSP_blk_move(&x[2*i*N/4], &xc[2*i*N/4 +
         i*CACHE_L1D_LINESIZE/2], 2*N/4);
}
                                   /* Compute first FFT stage */
fft16x16rc(N, &x_s[0], &w[0], GAP, y, N/4, 0, N);
                                   /* Compute remaining FFT stages */
for(i=0; i<4; i++)
fft16x16rc(N/4,&xc[2*i*N/4+ i*CACHE_L1D_LINESIZE/2],
       &w[2*3*N/4], NO_GAP, y, RADIX, 3*N/4, N);
```

Listing 5

The new access pattern is used for all FFT stages that exceed the cache capacity. Once the FFT has been decomposed to the stage where an entire sub-FFT data set fits into cache, the normal access pattern is used. Before the modified FFT routine can be called, the four input data sets have to be moved apart. This can be done as shown in Listing 6.

```
                         /* Copy and split the input data */
for(i=0; i<4; i++)
id = DAT_copy(&xi[2*i*N/4], &x[2*i*N/4 +
       i*CACHE_L1D_LINESIZE/2], 2*N/4*sizeof (short));
                         /* Perform other tasks */
```

```
        ...
        DAT_wait(id);
                                /* Compute first FFT stage */
        ...
```

Listing 6

The size of the input array has to be increased by 3 cache lines. Because the output data of the first stage is split up, the start of each sub-FFT must be offset accordingly. The argument list of the FFT routine is modified to accept a gap flag that indicates if the input data was split up. If gap=1, then the input data is split up. If gap=0, then the input data is continuous as normal.

The savings in the number of conflict misses for the first stage far outweighs the additional overhead introduced by splitting up the input data. Splitting the data can also be performed in the background, if a direct memory access unit (DMA) is used.

The Table 4 shows the cycle count results for an example 8192 point FFT using an L1D cache size of 16K bytes.

|  | blk_move | First Pass | Total with blk_move | Total without blk_move |
|---|---|---|---|---|
| Execute Cycles | 4620 | 10,294 | 77,090 | 72,470 |
| L1D Stalls | 1100 | 6101 | 19,098 | 17,998 |
| L1D Read Miss Stalls | 1100 | 6101 | 12,990 | 11,890 |
| L1D Read Misses | 514 | 903 | 2334 | 1820 |
| L1D Write Buffer Full Stalls | 0 | 0 | 6108 | 6108 |
| L1P Stalls | 50 | 141 | 227 | 177 |
| L1P Misses | 14 | 27 | 49 | 35 |
| Total Cycles | 5771 | 16,536 | 96,415 | 90,644 |

Table 4

Note that the number of L1D cache stalls is greatly reduced from 43,993 to only 6101 cycles. The overhead due to stalls and the block move operation is 34 percent. If background direct memory access operations are used instead of block moves, the overhead drops to 26 percent.

What is claimed is:

1. The method of performing an N-point radix-R Fast Fourier Transform in a data processing apparatus having a data cache comprising the steps of:
   comparing the data set of input data and twiddle factors with the size of the data cache;
   if said data set is smaller than said data cache, performing said Fast Fourier Transform in $\log_R N$ stages on all the data set in one pass; and
   if said data set is larger than said data cache but smaller than R times the data cache
      dividing said input data into R continuous data sets where each of said R continuous data sets fit within the data cache;
      disposing said input data into memory, each R continuous data set in continuous memory locations with a space in memory locations from an end of one continuous data set to a beginning of a next continuous data set equal to the size of a cache line;
      separately and independently performing a first stage radix-R butterfly computations on all the R continuous data sets thereby producing R independent intermediate data sets in a first pass each of which fits within the data cache; and
      successively performing second and all subsequent stage butterfly computations on each independent intermediate data set in turn producing corresponding output data in second passes.

2. The method of claim 1, wherein:
   said Fast Fourier Transform uses complex input data and complex twiddle factors of M bytes each; and
   said step of comparing the data set with the size of the data cache compares the data cache size to 4 N×M bytes.

3. The method of claim 1, wherein:
   said radix-R is radix-2.

4. The method of claim 1, wherein:
   said radix-R is radix-4.

5. The method of claim 1, further comprising:
   if said data set is larger than R times the data cache
      performing I initial stages of radix-R butterfly computations on all the input data producing R independent intermediate data sets, where I is the next integer greater than $\log_R(D/C)$, D is the size of the data set and C is the size of the cache; and
      successively performing all subsequent stage butterfly computations on each independent intermediate data set in turn producing corresponding output data in second passes.

* * * * *